US006622510B2

(12) United States Patent
Giroux et al.

(10) Patent No.: US 6,622,510 B2
(45) Date of Patent: Sep. 23, 2003

(54) FROZEN BEER PRODUCT, METHOD AND APPARATUS

(75) Inventors: Mark S. Giroux, St. Louis, MO (US); Joseph M. Trewhella, Godfrey, IL (US); Darryl Alan Goodson, St. Louis, MO (US)

(73) Assignee: Grindmaster Crathco Systems, Inc., Louisville, KY (US)

( * ) Notice: Subject to any disclaimer, the term of this patent is extended or adjusted under 35 U.S.C. 154(b) by 0 days.

(21) Appl. No.: 10/000,793

(22) Filed: Nov. 1, 2001

(65) Prior Publication Data

US 2002/0083730 A1 Jul. 4, 2002

Related U.S. Application Data

(60) Provisional application No. 60/245,075, filed on Nov. 1, 2000.

(51) Int. Cl.$^7$ ................................................. A23P 1/00
(52) U.S. Cl. ........................................ 62/342; 426/524
(58) Field of Search ................ 62/342, 389, 68, 62/177; 222/146, 6; 426/524

(56) References Cited

U.S. PATENT DOCUMENTS 2,194,775 A * 3/1940 Stadfeld ..................... 222/399
3,379,029 A * 4/1968 King ........................... 62/156

(List continued on next page.)

OTHER PUBLICATIONS

Grindmaster Crathco Systems, Inc. product literature titled "Beverage Freezers", undated, but prior to May 30, 2000, 69 pages.
Grindmaster Crathco Systems, Inc. product literature titled "Crathco Frozen Beverage Freezers" undated, but prior to Jul. 18, 2000, 129 pages.
Grindmaster Crathco Systems, Inc. product literature titled "Crathco Frozen Beverage Dispensers" undated, but prior to Jun. 9, 2000, 69 pages.

Primary Examiner—William E. Tapolcai
(74) Attorney, Agent, or Firm—Stites & Harbison, PLLC; David W. Nagle, Jr.; Mandy V. Wilson

(57) ABSTRACT

A method of freezing and dispensing a beer product comprises providing beer in a sealed, refrigerated storage container under pressure; feeding beer from the storage container to a sealed freezing chamber through a sealed delivery system; freezing the beer in the chamber; and dispensing frozen beer from the chamber.

The frozen beer product preferably has a slush consistency and a density of about 50% to about 90% of the density of unfrozen beer, a temperature of between about 23° and 27° F. and a volume reduction in a filled 14 fluid ounce plastic cup sitting in 70° F. room for 30 minutes or less than 10%.

A refrigerated cabinet for supplying beer comprises an insulated beer storage compartment; a refrigeration system comprising a compressor, a condenser, a thermal expansion device and an evaporator; a pressurized carbon dioxide tank in a separate, non-refrigerated compartment; and a fan for circulating air within the insulated beer storage compartment.

A beer freezing and dispensing apparatus comprises a freezing chamber; a refrigeration system for cooling the beer in the freezing chamber to a frozen state; a dispensing system for dispensing frozen beer from the freezing chamber when it reaches a slush consistency, and a beer delivery system for delivering beer to the freezing chamber, the beer delivery system comprising; a valve for controlling the introduction of beer into the delivery system; a check valve to prevent beer from flowing backwards out of the delivery system; an accumulator for holding beer that expands when beer freezes in the chamber; and a pressure sensor for sensing the pressure of the beer between the accumulator and the freezing chamber.

The method and apparatus may also be used to freeze and dispense other single-strength beverages.

8 Claims, 6 Drawing Sheets

U.S. PATENT DOCUMENTS

| | | | |
|---|---|---|---|
| 3,410,103 A | | 11/1968 | Cornelius |
| 3,608,779 A | | 9/1971 | Cornelius |
| 3,979,024 A | * | 9/1976 | Hoppe ........................ 137/574 |
| 3,995,770 A | * | 12/1976 | Schwitters ............... 222/129.1 |
| 4,201,558 A | * | 5/1980 | Schwitters et al. ......... 137/594 |
| 4,381,099 A | | 4/1983 | Knedlik |
| 4,440,795 A | * | 4/1984 | Goldstein et al. ........... 426/490 |
| 4,448,036 A | * | 5/1984 | Iannelli ................... 165/109.1 |
| 4,505,409 A | | 3/1985 | Armstrong |
| 4,784,297 A | | 11/1988 | Katz |
| 4,854,923 A | | 8/1989 | Sexton et al. |
| 4,869,396 A | * | 9/1989 | Horino et al. ........... 222/146.6 |
| 4,934,150 A | | 6/1990 | Fessler |
| 4,964,542 A | | 10/1990 | Smith |
| 5,095,710 A | | 3/1992 | Black et al. |
| 5,199,609 A | | 4/1993 | Ash, Jr. |
| D337,019 S | | 7/1993 | Newman |
| 5,304,384 A | * | 4/1994 | Murray et al. ................. 426/16 |
| 5,323,691 A | | 6/1994 | Reese et al. |
| 5,363,671 A | | 11/1994 | Forsythe et al. |
| 5,463,877 A | | 11/1995 | Young et al. |
| D373,280 S | | 9/1996 | Johnson |
| 5,615,559 A | * | 4/1997 | Kress et al. .................. 62/136 |
| 5,692,392 A | | 12/1997 | Swier |
| 5,706,661 A | | 1/1998 | Frank |
| 5,772,075 A | | 6/1998 | Asj, Jr. et al. |
| 5,803,377 A | | 9/1998 | Farrell |
| 5,869,114 A | * | 2/1999 | Murray et al. ................. 426/11 |
| 5,962,060 A | | 10/1999 | Farrell |
| 6,082,123 A | | 7/2000 | Johnson |
| 6,082,589 A | | 7/2000 | Ash et al. |
| 6,325,117 B1 | | 12/2001 | Burke et al. |

* cited by examiner

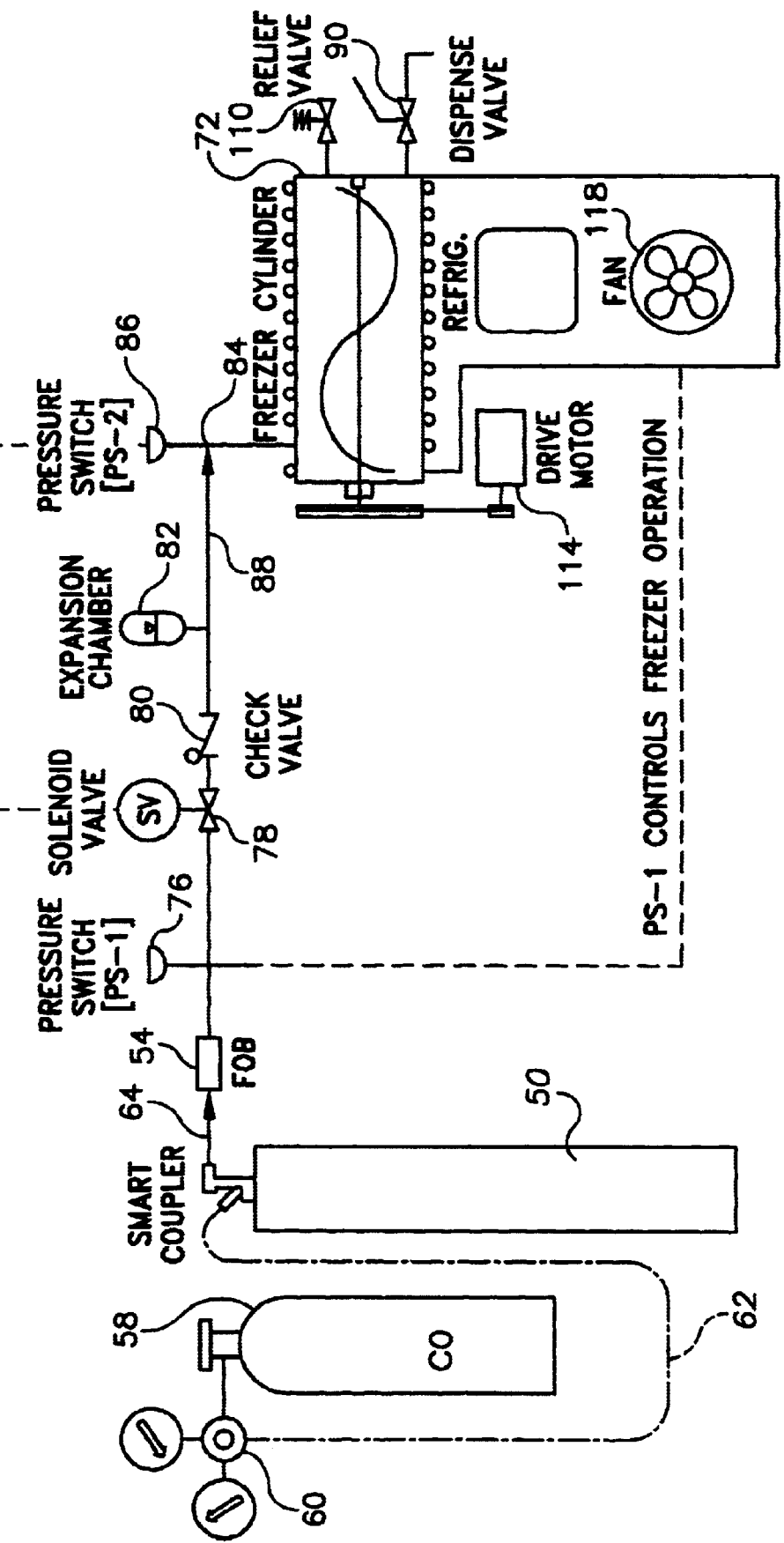

FROZEN BEER PRODUCT, METHOD AND APPARATUS

REFERENCE TO EARLIER FILED APPLICATION

The present application claims the benefit of the Nov. 1, 2000 filing date under 35 U.S.C. § 119(e) of Provisional U.S. patent application Ser. No. 60/245,075, which is hereby incorporated by reference.

BACKGROUND OF THE INVENTION

The present invention relates to a frozen beer product, an apparatus for freezing and dispensing beer, and a method of freezing and dispensing beer and other single-strength beverages.

Frozen beverages, usually of a slush consistency, are well known. Equipment has been developed for freezing carbonated and noncarbonated beverages. In a typical frozen carbonated beverage machine, water, carbon dioxide and a flavored, sweetened syrup are supplied to the machine. The carbon dioxide and water are mixed to form carbonated water. The syrup is added and the mixture is then frozen.

In other equipment, the beverage to be frozen is held in a tank and drawn out by gravity into a freezing chamber.

Heretofore it has not been commonly known to use beer to make a frozen beverage. Part of the problem with using beer is that the beer contains alcohol, which reduces its freezing point. Another drawback has been that in equipment used to freeze products from a full-strength initial beverage (also referred to herein as a single-strength beverage), the beverage was exposed to air. Especially with citrus based beer, exposure to air generates an off-taste in the product. Beer manufacturers are very concerned that their products are handled and dispensed in such a way that no foreign material is introduced into the beer, and that no off-tastes are generated in it.

If a frozen beer product could be commercially produced, it would be desirable that the frozen product not experience a high level of volume reduction between the time it is served and when it is consumed. If the dispensed frozen beer product fills up a cup when initially served, but melts, settles or otherwise significantly reduces in volume in a short time, customers may feel cheated. Thus it would be beneficial to develop a frozen beer product that maintains at least 90% of its volume during the first 30 minutes after being served.

It would also be beneficial if equipment used to produce a frozen beer product could be self-contained and portable, such that it could be moved from place to place within an establishment that desires to sell a frozen beer product.

SUMMARY OF THE INVENTION

A frozen beer product and apparatus for producing it has been invented that, in its preferred embodiments, solves the aforementioned problems and has the identified positive attributes.

In a first aspect, the invention is a method of freezing and dispensing a beer product comprising; providing beer in a sealed, refrigerated storage container under pressure; feeding beer from the storage container to a sealed freezing chamber through a sealed delivery system; freezing the beer in the chamber; and dispensing frozen beer from the chamber.

In a second aspect, the invention is a beer freezing and dispensing system comprising: a source of refrigerated beer under pressure; a sealed freezing chamber; a sealed delivery system connecting the source of refrigerated beer to the freezing chamber; and a dispensing system for dispensing frozen beer from the freezing chamber.

Other aspects of the invention are applicable to single-strength beverages in general, rather than just beer.

In its preferred method, the beer remains in a sealed system and is not brought into contact with air until it is dispensed. Furthermore, other than carbon dioxide used to pressurize the system and force the beer from the storage container and through the beer freezing and dispensing system, no other substance or material is introduced into the system. The beer is not contaminated or diluted in the preferred method of the invention, as carbon dioxide is normally present in beer and is not considered a foreign material.

The preferred apparatus is portable. Moreover, the self-contained beer storage unit could be used separately as a self-contained beer storage and serving unit. However it is designed to be able to carry the weight of the beer freezing and dispensing apparatus so that both can be rolled out to a place where frozen beer products are desired and simply plugged into a standard electrical wall outlet.

These and other advantages of the invention, as well as the invention itself, will be best understood in view of the attached drawings.

BRIEF DESCRIPTION OF THE DRAWINGS

FIG. 8 is a schematic drawing of the entire beer supply, delivery, freezing and dispensing system of FIG. 1.

DETAILED DESCRIPTION OF THE DRAWINGS AND PREFERRED EMBODIMENTS OF THE INVENTION

Figure 1:
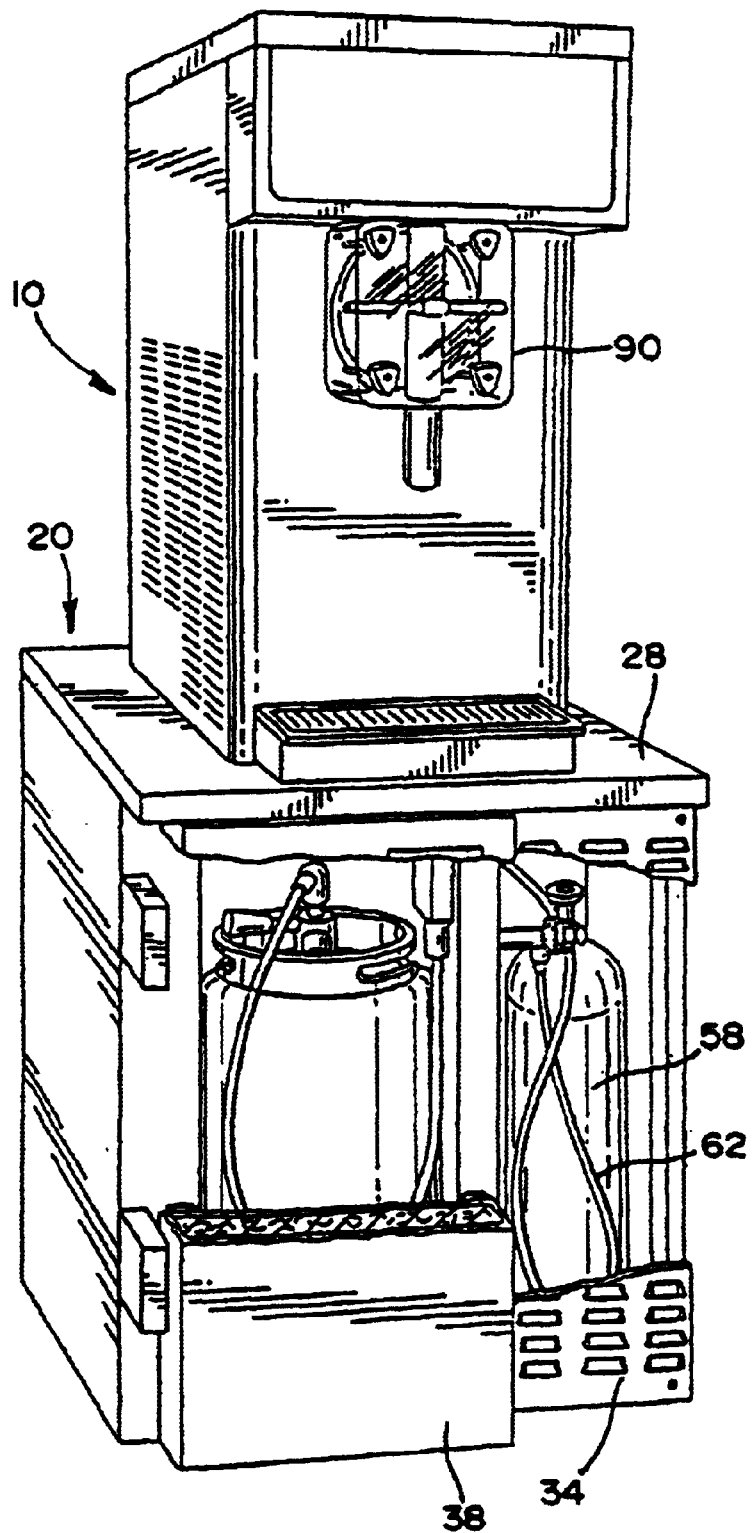
FIG. 1 is a perspective view of a preferred beer freezing and dispensing apparatus sitting on top of a preferred portable refrigerated beer supply cabinet of the present invention.

FIG. 1 shows a preferred beer freezing and dispensing apparatus 10 sitting on top of a preferred portable refrigerated beer supply cabinet 20 of the present invention. The apparatus 10 and cabinet 20 can be used independently of one another, although preferably they are used together, with the apparatus 10 mounted on top of the cabinet 20 as shown. The details of the preferred cabinet 20 will be described first, followed by a description of the preferred beer freezing and dispensing apparatus 10. FIG. 8 shows the components of the two systems in schematic form.

Figure 2:
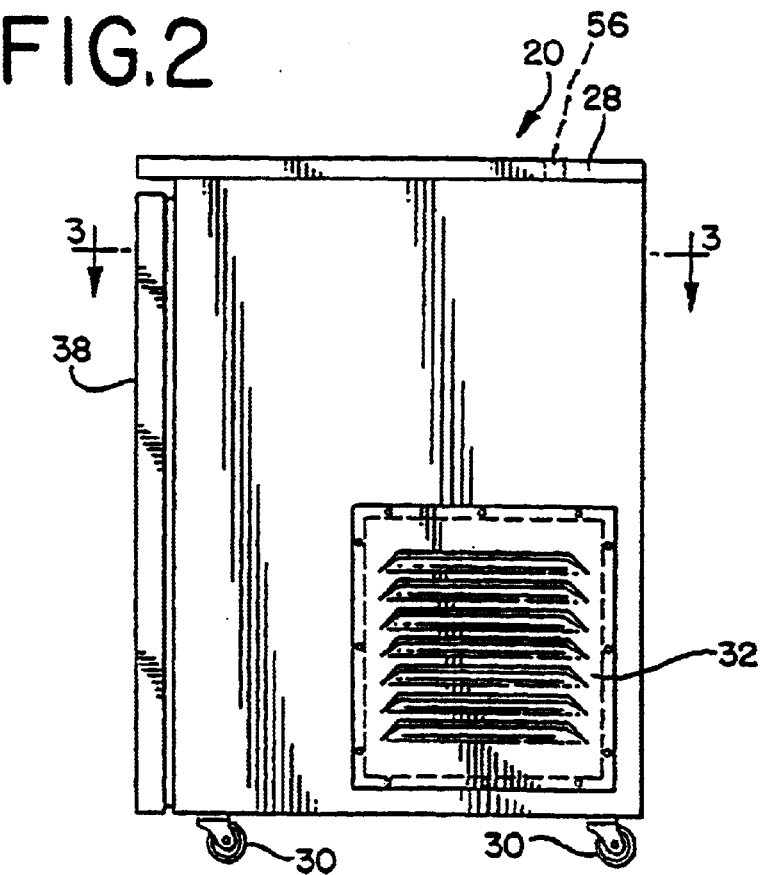
FIG. 2 is a elevational side view of the refrigerated beer supply cabinet of FIG. 1.
Figure 3:
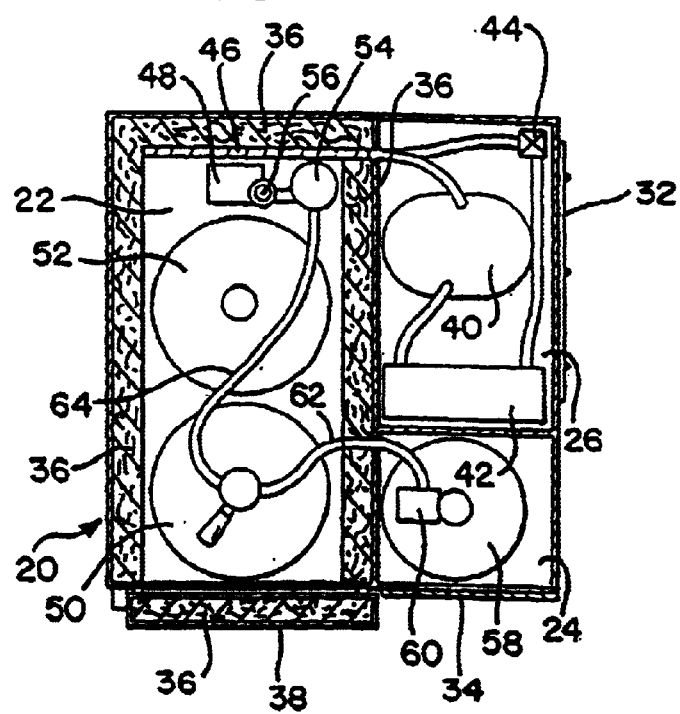
FIG. 3 is a cross-sectional view taken along line 3—3 of FIG. 2.

As best shown in FIG. 3, the refrigerated beer supply cabinet 20 preferably has three major compartments: an insulated beer storage compartment 22, a carbon dioxide cylinder storage compartment 24 and a refrigeration system compartment 26. The cabinet 20 is preferably constructed of stainless steel with a flat horizontal top portion 28 (FIG. 2) that serves as a countertop and wheels 30 on the bottom that allow the cabinet to be rolled across a floor. Vent 32 is built into the cabinet wall forming one of the outside walls of the refrigeration system compartment 26. A slotted cover 34 fits over the front of the carbon dioxide cylinder storage compartment 24.

The walls, floor and ceiling of the beer storage compartment 22 are covered with insulation 36. The front wall is hinged to the cabinet to form an access door 38. Preferably the walls are made by injecting foam insulation between inside and outside wall panels as the cabinet is constructed.

The cabinet includes a built in refrigeration system including a compressor 40, a condenser 42, a thermal expansion device 44 and an evaporator 46. The refrigeration system is conventional and therefore not described in detail. The evaporator 46 is fixed to the back wall of beer storage compartment 22. Preferably the evaporator is in the form of serpentine coils of copper tubing. A fan 48 is mounted inside the compartment 22 to circulate air within the compartment. Preferably the fan 48 blows air onto the back wall where the evaporator 46 is attached. The air circulates from the back wall to contact the beer storage containers 50 and 52. The storage compartment 22 preferably holds a plurality of beer storage containers so that a standby container will be on hand and cooled, ready to use, if the first container is emptied. The preferred beer storage containers 50 and 52 are standard 116th barrel sealed beer storage containers (holding approximately 5 gallons each). They have a built in tube that allows pressurized carbon dioxide entering the container to force beer out of the container, as is well known in the art. A standard tavern head fits on the beer storage containers. A standard FOB device 54 is used to control the flow of beer out of the refrigerated beer storage compartment. A hole 56 in the top of cabinet 20 is used to run a beer line from the FOB device 54 up to the beer freezing and dispensing apparatus 10.

A pressurized carbon dioxide tank 58, preferably in the form of a commercially available compressed gas cylinder with certified food-grade C02 gas, supplies carbon dioxide to the beer storage container 50. A pressure regulator 60 is used to provide a controlled amount of pressure in the beer storage containers. A C02 line 62 extends from the pressure regulator 60 to the tavern head on container 50, and a beer line 64 extends from the tavern head on container 50 to the FOB device 54. These lines stay connected to the tavern head when container 50 becomes empty and the tavern head is moved to container 52. The tank 58, container 50 and lines 62 and 64 thus provides a sealed source of refrigerated beer under pressure.

The beer freezing and dispensing apparatus 10 has several major systems. The preferred embodiment of the apparatus 10 utilizes many parts of a Model 3311 Crathco brand frozen beverage dispenser, sold by Grindmaster Crathco Systems, Inc. of 4003 Collins Lane, Louisville, Ky. 40245. To the extent the components and systems for the Model 3311 dispenser are used without modification in the preferred embodiment of the invention, and do not otherwise need to be discussed, they are not described in further detail. For example, the refrigeration system, including a compressor, condenser, condenser fan, expansion device and evaporator, are standard. The freezing chamber with a rotatable scraper mounted inside, and the motor used to drive the scraper, and control system for the motor are also standard. The main difference is that a mix hopper used to hold product normally gravity fed into the freezing chamber in the Model 3311 dispenser is not used. Instead, a sealed beer delivery system (described below) is constructed in the top part of the cabinet housing of the Model 3311 where the mix hopper would normally be found.

Figure 4:
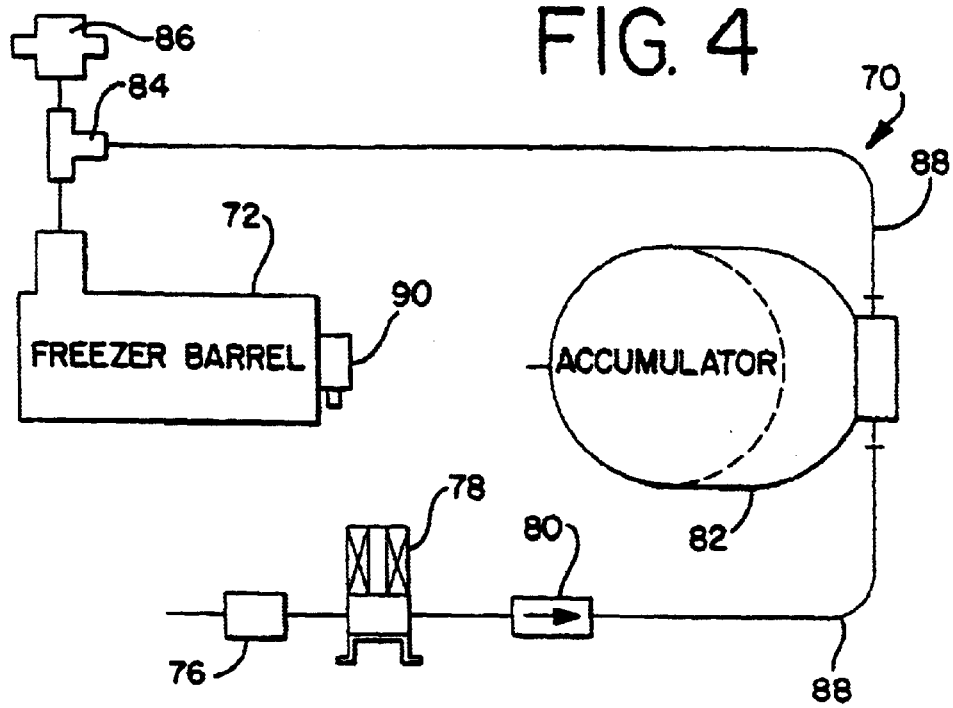
FIG. 4 is a schematic drawing of the beer delivery system of the apparatus of FIG. 1.

The preferred sealed beer delivery system 70 is best understood in view of the schematic drawings of FIGS. 4 and 8. The system 70 connects the source of refrigerated beer under pressure to the freezing chamber, which is preferably a freezer barrel or cylinder 72 having a cylindrical freezing surface 73 (FIG. 7) around the perimeter of the barrel. Coils 75 on the outside of the barrel 72 carry refrigerant to cool freezing surface 73. Scrapers 74, rotatably mounted inside the freezer barrel 72, are turned by a motor 114 (FIG. 8) as in a conventional Model 3311 dispenser. The scrapers remove beer frozen to the freezing surface and mix the frozen beer in towards the center of the freezer barrel 72.

The beer delivery system itself preferably includes a first pressure switch 76, a solenoid valve 78, a check valve 80, an accumulator or expansion chamber 82, a tee 84 and a second pressure switch 86. The first pressure switch is used to detect whether beer under pressure is being provided. If the container 50 becomes empty, the FOB device 54 shuts the line from the container so that carbon dioxide does not flow through the system. When this shuts, the pressure downstream of the FOB device 54 quickly falls. The first pressure switch 76 senses that there is no pressure' and is used to control the refrigeration and other components of the beer freezing and dispensing apparatus 10 as more fully explained below.

The solenoid valve 78 is a valve used to control introduction of beer into the delivery system 70, and thus into the freezing chamber. Solenoid valve 78 is opened when the second pressure switch 86, which serves as a pressure sensor, senses a drop in the pressure of the beer in the freezing chamber, or more preferably at a point in between the accumulator and freezing chambers as shown in FIGS. 4 and 8.

Check valve 80 prevents beer from flowing backwards out of the delivery system 70. When the beer is first introduced into the freezing chamber and starts to freeze, it expands. The increased pressure in the system due to this expansion forces beer out of the freezing chamber. The beer is prevented by the check valve 80 from flowing backwards. Instead, accumulator 82 stores the increased beer volume until frozen beer is dispensed. The accumulator 82 is a bladder-type device, and is supplied with a static pressure of preferably 20 psi. The solenoid valve 78 is preferably made with stainless steel product-contact components. In fact, it is preferred that the beer delivery system is made with stainless steel tubing 88, and that certain plastics be avoided in the parts that contact the beer. Particularly, plastics that may cause an off-taste in the beer are to be avoided. It is also preferred that the tubing 88 be formed with as few bends as possible, and that it have an inside diameter of at least 0.21 inches, and more preferably at least 0.35 inches. It has been found that greater tube diameters and fewer restrictions in the beer delivery system 70 improves the performance of the equipment.

Figure 5:
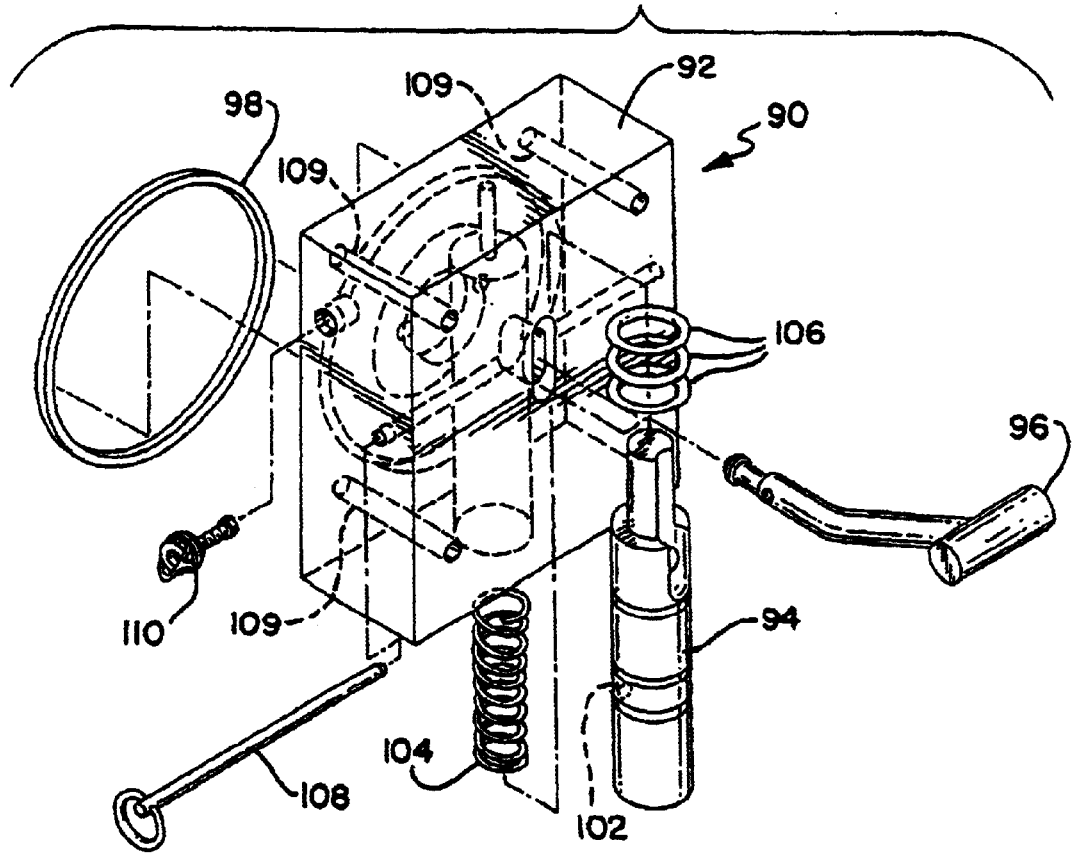
FIG. 5 is an exploded view of the dispensing system used on the apparatus of FIG. 1.
Figure 7:
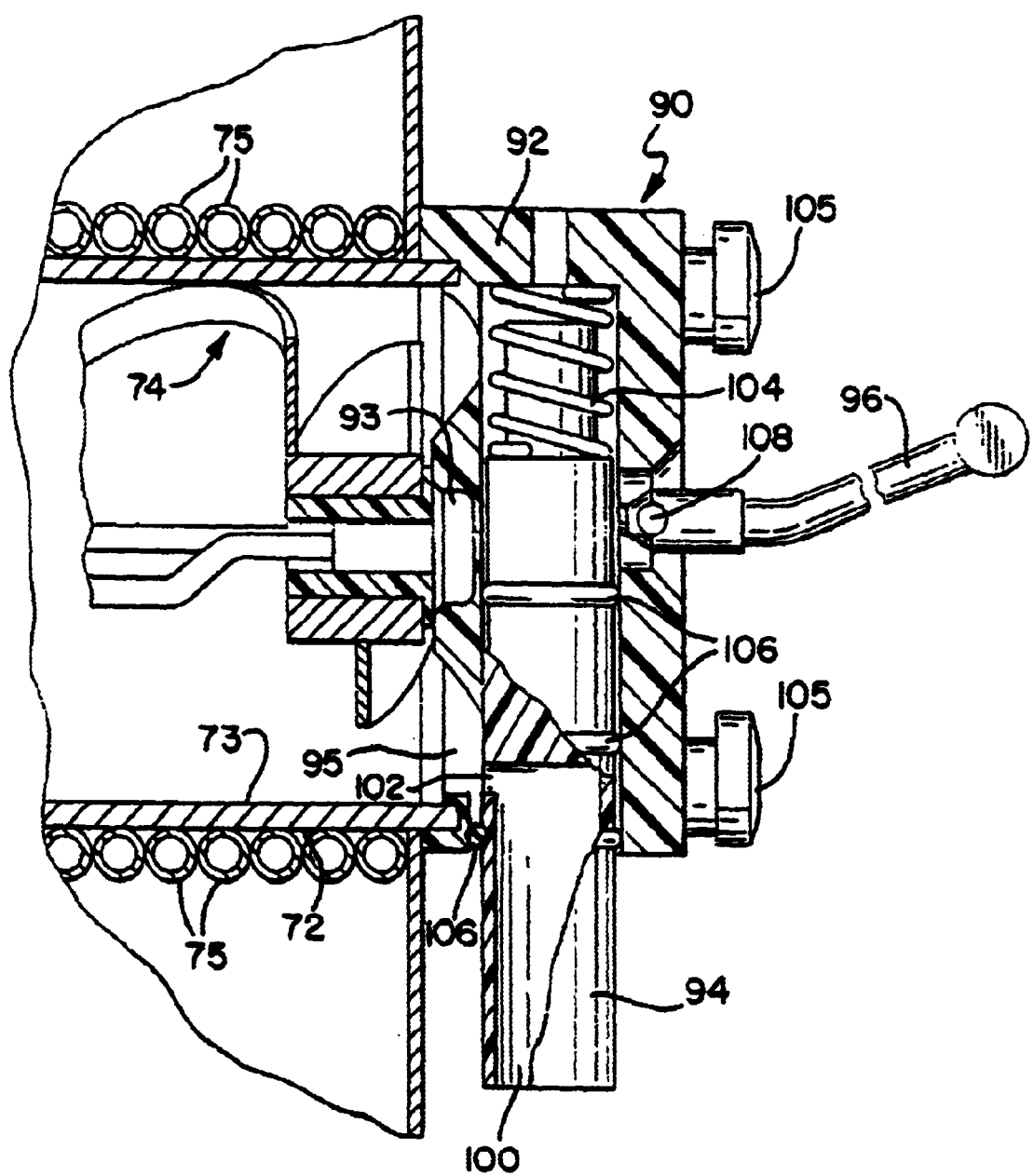
FIG. 7 is a partial cross-sectional view of the freezing chamber and dispensing system of FIG. 1.

A dispensing system 90 for delivering frozen beer from the freezing chamber is shown in FIGS. 5 and 7. With a few minor changes, the preferred dispensing system 90 is the same as that used on the Model 3311 Crathco dispenser. Details of a preferred dispensing system are disclosed in U.S. Pat. No. 5,463,877, incorporated herein by reference. The system 90 comprises a valve block 92, a valve cylinder 94 and a handle 96 for actuating the valve cylinder 94 between an opened and a closed position. The valve block 92 is mounted on the front of the freezer barrel 72. A bore in the center of the back of the block 92 is used to mount a bearing 93 that Supports the front end of the scraper assembly. Gasket 98 seals the block 92 and freezer barrel 72. An opening 95 in the bottom block 92 allows frozen product to enter the vertical bore in which valve cylinder 94 is mounted.

As best shown in FIG. 7, the valve cylinder 94 has a flow channel 100 through it. Product enters into the flow channel 100 through a port 102 drilled into the cylinder 94. The cylinder is biased closed by a spring 104. O-rings 106 are used to seal the cylinder 94 in its bore. A retaining pin 108 passes through the block 92 and a hole in the stem of handle 96, providing a pivot. The distal end of handle 96 fits into a recess in cylinder 94. Thus as the handle 96 is pushed down, cylinder 94 travels upward, exposing the port 102 to the entry way 95 in the back of block 92. A spring loaded relief valve 110 is fit in the top section of the block 92 so as to be in communication with the top portion of freezer barrel 72. When the freezer barrel 72 is to be filled, it is preferably first flushed with carbon dioxide and then relief valve 110 is used to let the gas escape while liquid beer fills the freezer barrel 72. Four horizontal bores 109 through the block 92 allow the block 92 to pass over studs (not shown) and be secured by wing nuts 105 to the front of the freezer barrel 72.

The flow channel 100 is preferably of a size such that the frozen beer has a flow path therethrough which, at its smallest point, has a cross-sectional area of 0.05 square inches or less. Preferably the port 102 is ¼ inch in diameter. With this size of flow path and with the minimum restrictions in the beer delivery system 70 discussed above, the preferred apparatus is able to dispense frozen beer at a rate of at least 2 fluid ounces per second, and more preferably at least 4 fluid ounces per second with a standard pressure in the beer delivery system of about 20 psi.

The frozen beer itself is preferably in the form of a slush. With the preferred apparatus it has been possible to produce a frozen beer with a density of between about 50% and about 90% of the density of the beer in an unfrozen state. Preferably the frozen beer will have a density of between about 60% and about 75% of the density of the beer when it is in an unfrozen state. The frozen beer product is preferably dispensed at a temperature of between about 23° F. and about 27° F. A preferred beer to use in the system of the present invention is a citrus based beer, such as Doc Otis® brand draft beer from Anheuser-Busch Incorporated.

The frozen beer product will also preferably have very low volume reduction as it sits waiting to be consumed. One way to test for volume reduction is to dispense the frozen beer into a standard 14 fluid ounce plastic cup to fill the cup. The cup is then allowed to sit in a room with an ambient air temperature of 70° F. After 30 minutes the volume of the product remaining in the cup is determined. Preferred products will have a volume reduction of less than 10%, and preferably less than 5%. This is due to the fact that the product is preferably dispensed at a fairly low temperature, so that not much of it melts during the 30 minutes. Also, there is little trapped gas to escape, which would also produce settling and higher volume reduction even if no melting occurred.

The consistency of the frozen beer is maintained by making adjustments on components within the drive system for the scrapers 74. The hardware used to make these adjustments is standard on the Model 3311 dispenser.

As the beer in the freezing barrel 72 becomes more and more frozen, the torque that must be applied to the scrapers 74 to get them to turn must be increased. In the Model 3311 the drive motor is mounted in such a way that it may pivot on an axis, but such pivoting is opposed by a spring. A mercury switch mounted on the body of the motor then opens and closes as the angle of the motor changes with changes in the torque applied by the motor. The amount of force applied by the spring can be adjusted.

Figure 6:
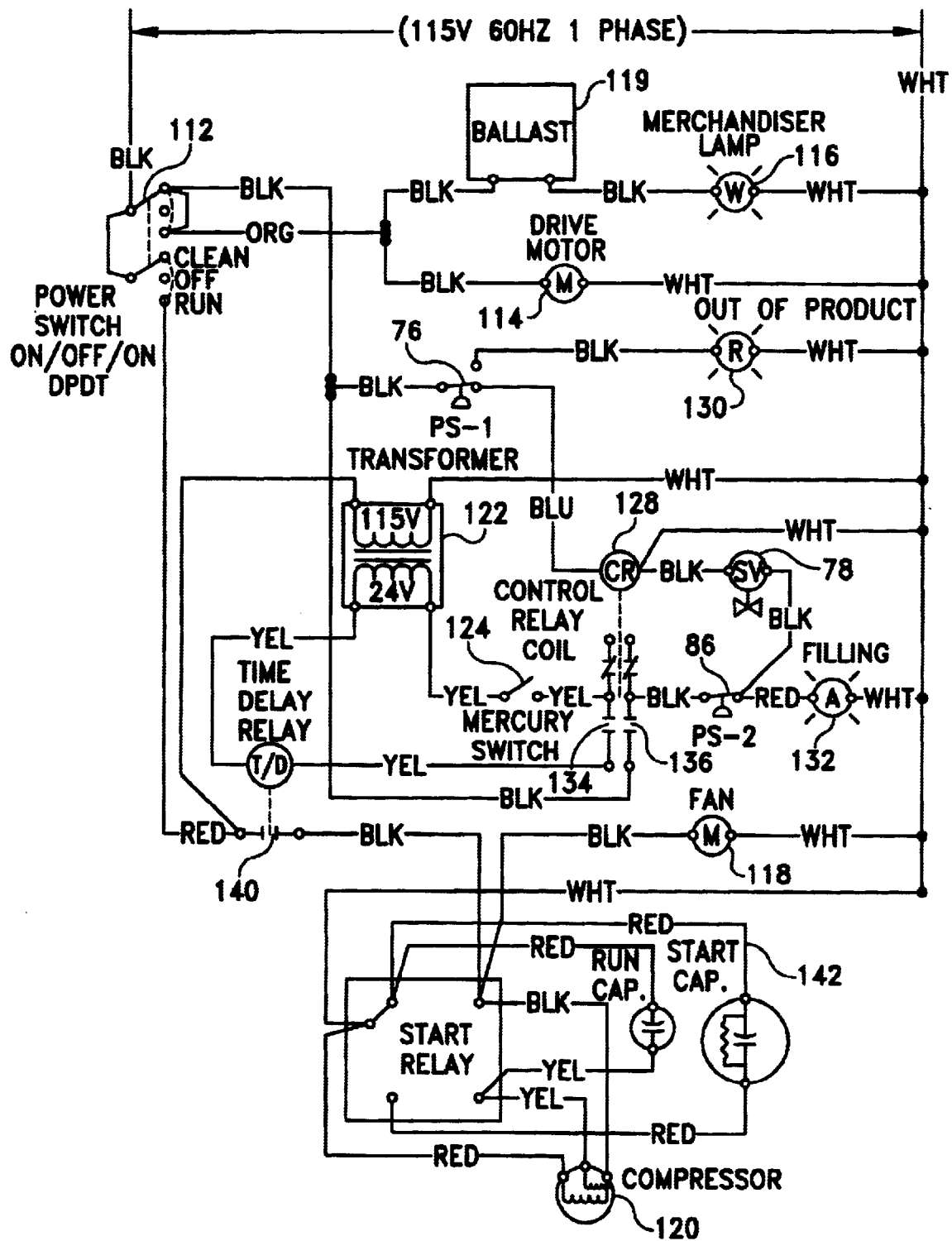
FIG. 6 is a schematic wiring diagram for the beer freezing and dispensing apparatus of FIG. 1.

The wiring diagram shown in FIG. 6 shows the control features for the preferred embodiment of the apparatus, including the mercury switch and other control features described above. A double pole, double throw main power switch 112 has three positions, "CLEAN", "OFF", and "RUN". In the position shown ("CLEAN"), the drive motor 114 and a merchandiser lamp 116 are energized, but no power flows to the compressor 120. A ballast 119 is preferably included in the circuit when a fluorescent lamp is used for merchandiser lamp 116. The "CLEAN" position is used during cleaning operations. A cleaning solution can then be passed through the machine without being frozen. If the main switch 112 is thrown all the way the other direction ("RUN"), the top portion of the circuit (drive motor 114 etc.) is energized and power is also provided to the compressor 120 and condenser fan 118. In this position a transformer 122 is also energized, providing a 24 volt current for the mercury switch 124. The first pressure switch 76, second pressure switch 86 and solenoid valve 78 are also shown in the wiring diagram of FIG. 6. A time delay relay 126, a control relay 128, red "out of product" signal lamp 130, amber "filling" signal lamp 132 and the compressor circuitry 142 (including conventional start and run capacitor and a start relay) are also shown.

If there is sufficient pressure in the beer delivery system 70, the first pressure switch 76 is closed so that control relay 128 is energized. The control relay 128 in that position closes two switches 134 and 136. On the other hand, if there is insufficient pressure, pressure switch 76 is open and control relay 128 is not energized. In that position, "out of product" lamp 130 lights up, indicating that the first beer storage container 50 is empty and second container 52 needs to be hooked up in the place of the container 50. When relay 128 is closed and mercury switch 124 is also closed, 24 volt power is fed to heat-activated time delay relay 126. As long as the relay 126 has sufficient heat, it keeps the switch 140 closed so that current flows to the compressor circuit 142. This time delay prevents repeated stopping and starting of the compressor due to momentary opening of the circuit containing the relay 126.

Meanwhile, when second pressure switch 86 signals that more beer is needed in the freezing, chamber, and control relay 128 is energized, normally closed solenoid valve 78 is energized to open. "Filling" lamp 132 is also energized so that the operator knows that beer is being added.

From the wiring diagram of FIG. 6 it can be seen that the compressor 120 only runs if the main switch 112 is in the "RUN" position, and the mercury switch 124 on the body of the motor is closed. As the compressor runs, the freezing surface 73 is cooled by expanding refrigerant in coils 75 and beer freezes. As the beer gets more and more frozen, the torque on the motor increases, causing the motor to pivot against the force of the return spring. Finally the motor will pivot so far that mercury switch 124 opens. The heater in time delay relay 126 starts to cool. If the mercury switch stays open long enough, the compressor 120 and fan 118 will be shut down. The motor 114 will continue to run, but the freezing surface will no longer be chilled. As the temperature in the freezing barrel starts to increase, either because warm beer is added or the frozen beer thaws over time, the torque on the motor will decrease, and mercury switch 124 will again close. After the element in time delay relay 126 becomes sufficiently hot, switch 140 will close again and the compressor will again run. The adjustments on the return spring associated with the motor drive thus allows the operator to control the consistency of the product in the freezer barrel. When the apparatus is used to freeze beer, the adjustments should be set to give the desired consistency to the frozen product, which will have a temperature in the range of about 23–27° F.

The first pressure switch 76 may preferably be a model 84-331-34 from Shurflo of Santa Ana, Calif. The accumulator 82 may preferably be a model 181-201 from Shurflo. The pressure switch 186 may preferably be a model MSPS-JJ15SS-F from Barksdale of Los Angeles, Calif. The solenoid valve 78 may preferably be a model 71215SN2SN00 from the Skinner division of Parker of New Britain. Conn.

A conventional thermostat can be used to keep the temperature of the beer in the beer storage compartment at between about 36° F. to about 40° F., and most preferably about 38° F.

The carbon dioxide tank is preferably stored at ambient temperature in its own compartment, but could be stored in one of the other compartments in the beer supply cabinet 20. The pressure in the container 50 is preferably between about 10 and about 30 psi, and is most preferably about 20 psi.

As can be seen from the above, the various sealed portions of the system prevent air from coming in contact with the beer until it is frozen and dispensed. The beer freezing and dispensing apparatus can be placed on the beer storage cabinet and wheeled to a desired location on the premises of the establishment serving the frozen beer.

It should be appreciated that the apparatus, product and methods of the present invention are capable of being incorporated in the form of a variety of embodiments, only a few of which have been illustrated and described above. The invention may be embodied in other forms without departing from its spirit or essential characteristics. For example, the beer freezing and dispensing apparatus 10 can be supplied with beer from a fixed location, such as kegs of beer in a walk-in cooler. Malt-type beer products can be frozen and dispensed with the apparatus, as well as other single strength beverages such as fruit juices.

The described embodiments are thus to be considered in all respects only as illustrative and not restrictive, and the scope of the invention, therefore, indicated by the appended claims rather than by the foregoing description. All changes which come within the

We claim:

1. An apparatus for the preparation and dispensing of a frozen slush beer including:
   (a) a freezing system for converting liquid beer into the frozen slush beer product, said freezing system having a freezing chamber and a connected accumulator for storing a portion of beer slush product that has expanded beyond the volume capacity of said chamber, said chamber and accumulator holding the beer slush product under a pressure of about 20 PSI until the slush beer product is dispensed;
   (b) a delivery system for delivering beer in liquid form to said freezing system; and
   (c) a dispensing system for dispensing the slush beer product from said chamber and accumulator to a container.

2. The apparatus of claim 1 in which said accumulator is connected to said freezing system at a point between said freezing system and said beer cooling system.

3. The apparatus of claim 1 in which said accumulator is a bladder-type device.

4. The apparatus of claim 1 in which the beer slush product is frozen to a temperature of between about 23° F. and about 27° F. thereby permitting the dispensing of a slush product having a density of about 50% to 90% of the density of beer in liquid form and minimal volume reduction over a predetermined period of time when being held in the container at ambient temperatures.

5. A beer freezing and dispensing system comprising:
   (a) a source of refrigerated beer under pressure;
   (b) a sealed freezing chamber;
   (c) a sealed delivery system connecting the source of refrigerated beer to the freezing chamber and having a first pressure switch, a solenoid valve, a check valve, an accumulator and a second pressure switch, the second pressure switch being located between the accumulator and the freezing chamber; and
   (d) a dispensing system for dispensing frozen beer from the freezing chamber.

6. The system of claim 5 wherein the first pressure switch detects whether pressurized beer is being delivered from the source of refrigerated beer.

7. The system of claim 5 wherein the second pressure switch controls the solenoid valve so as to introduce more beer into the freezing chamber when pressure in the freezing chamber is reduced by dispensing the frozen beer.

8. A beer freezing and dispensing system comprising:
   (a) a source of refrigerated beer under pressure;
   (b) a sealed freezing chamber;
   (c) a sealed delivery system connecting the source of refrigerated beer to the freezing chamber; and
   (d) a dispensing system for dispensing frozen beer from the freezing chamber having an accumulator, said accumulator having a bladder device with a static pressure of about 20 psi.

* * * * *

UNITED STATES PATENT AND TRADEMARK OFFICE
CERTIFICATE OF CORRECTION

PATENT NO. : 6,622,510 B2
DATED : September 23, 2003
INVENTOR(S) : Giroux et al.

It is certified that error appears in the above-identified patent and that said Letters Patent is hereby corrected as shown below:

<u>Title page,</u>
Item [75], Inventors, should read as follows:

-- [75] Inventors: Mark S. Giroux, St. Louis, MO (US); Joseph M. Trewhella, Godfrey, IL (US); Darryl Alan Goodson, St. Louis, MO (US); Michael J. Edrington, Louisville, KY (US); and Richard L. Sipp, Crestwood, KY (US). --

Signed and Sealed this

Third Day of February, 2004

JON W. DUDAS
*Acting Director of the United States Patent and Trademark Office*